United States Patent
Overman et al.

(10) Patent No.: US 7,844,413 B2
(45) Date of Patent: Nov. 30, 2010

(54) SELF-GENERATED TEST AUTOMATION

(75) Inventors: Angela E. Overman, Derry, NH (US); Eric S. Noya, Groton, MA (US); Jeffrey T. Wong, Newton, MA (US)

(73) Assignee: Broadcom Corporation, Irvine, CA (US)

( * ) Notice: Subject to any disclaimer, the term of this patent is extended or adjusted under 35 U.S.C. 154(b) by 1122 days.

(21) Appl. No.: 11/219,911

(22) Filed: Sep. 7, 2005

(65) Prior Publication Data
US 2007/0006046 A1 Jan. 4, 2007

Related U.S. Application Data

(60) Provisional application No. 60/695,187, filed on Jun. 30, 2005.

(51) Int. Cl.
*G01M 19/00* (2006.01)
*G01R 31/00* (2006.01)

(52) U.S. Cl. ................. 702/123; 702/120; 702/121; 702/122

(58) Field of Classification Search ......... 702/120–125; 455/67.14
See application file for complete search history.

(56) References Cited

U.S. PATENT DOCUMENTS

| 2005/0048925 A1* | 3/2005 | Rands ......... 455/67.14 |
| 2010/0070549 A1* | 3/2010 | Nagaraj ........ 708/254 |

* cited by examiner

*Primary Examiner*—Mohamed Charioui
*Assistant Examiner*—Phuong Huynh
(74) *Attorney, Agent, or Firm*—Sterne, Kessler, Goldstein & Fox P.L.L.C.

(57) ABSTRACT

Self-generated automated tests can use a pseudo-random number generator to select one or more arguments that are passed to programs and scripts. The random arguments are driven by a configuration file where the limits for the parameters are defined. Multidimensional functions with multidimensional parameters can be tested. Test duration can be limited by time, number of iterations, or by any of the multidimensional functions or parameters. A pseudo-random seed for each test is recorded so that a test case can be reproduced if a failure is detected or otherwise.

33 Claims, 4 Drawing Sheets

SELF-GENERATED TEST AUTOMATION

CROSS-REFERENCE TO RELATED APPLICATIONS

This application claims the benefit of U.S. Provisional Application No. 60/695,187, filed Jun. 30, 2005, by Overman et al., entitled "Self-Generated Test Automation," incorporated herein by reference in its entirety.

BACKGROUND OF THE INVENTION

1. Field of the Invention

The present invention relates generally to test script automation, and more specifically, to randomly producing automated test scripts.

2. Related Art

Test script automation, while not standardized, can be used to test one or more components of a system. However, conventional test script automation programs lack the ability to self-generate a test case. A programmer must design and develop a script to cover all possible test cases, including any rarely occurring fringe cases. Otherwise, any scenario that is not conceived and scripted by the programmer would not be evaluated by the test program. Therefore, a need exists for a technology that addresses these concerns and allows more efficient and effective testing that can be easily tracked and reproduced.

SUMMARY OF THE INVENTION

One or more self-generated automated tests are produced and executed to evaluate a device or a system having multidimensional functions and/or multidimensional parameters. To produce a self-generated test, one or more arguments (of, for example, a script) are selected and passed to a test script or a test application program. Each argument can be randomly selected and includes test commands for evaluating one or more functions of the device or system under test.

To drive the one or more arguments, a configuration file is executed to select a value for one or more parameters that are passed to the test script or the test application program. One or more of the parameter values can be randomly selected and applied to establish a limit for a corresponding parameter.

Since the arguments and/or the parameter values of the self-generated automated tests are automatically selected, specific test scripts can be automatically produced to cover each and every test case, including fringe cases, to evaluate a device or a system without a programmer having to manually write such test scripts.

A random-number generator can be utilized to generate a seed value. The seed value corresponds to the one or more arguments associated with each self-generated test. The seed value can also be stored for future use. As a result, the recorded seed value can be used to recall and re-execute a previously implemented test.

A random-number generator can also be utilized to generate values for the test parameters. Likewise, these values can also be recorded with the seed value, such that a previously self-generated test can be repeated.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art(s) to make and use the invention. In the drawings, like reference numbers indicate identical or functionally similar elements. Additionally, the leftmost digit(s) of a reference number identifies the drawing in which the reference number first appears.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art(s) to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

One or more self-generated automated tests can be produced and executed to evaluate a device or a system having multidimensional functions and/or multidimensional parameters. To produce a self-generated automated test, one or more arguments (of, for example, a script) are selected and passed to a test script or a test application program. Each argument can be randomly selected and includes test commands for evaluating one or more functions of the device or system under test (herein referred to collectively as "SUT").

Figure 1:
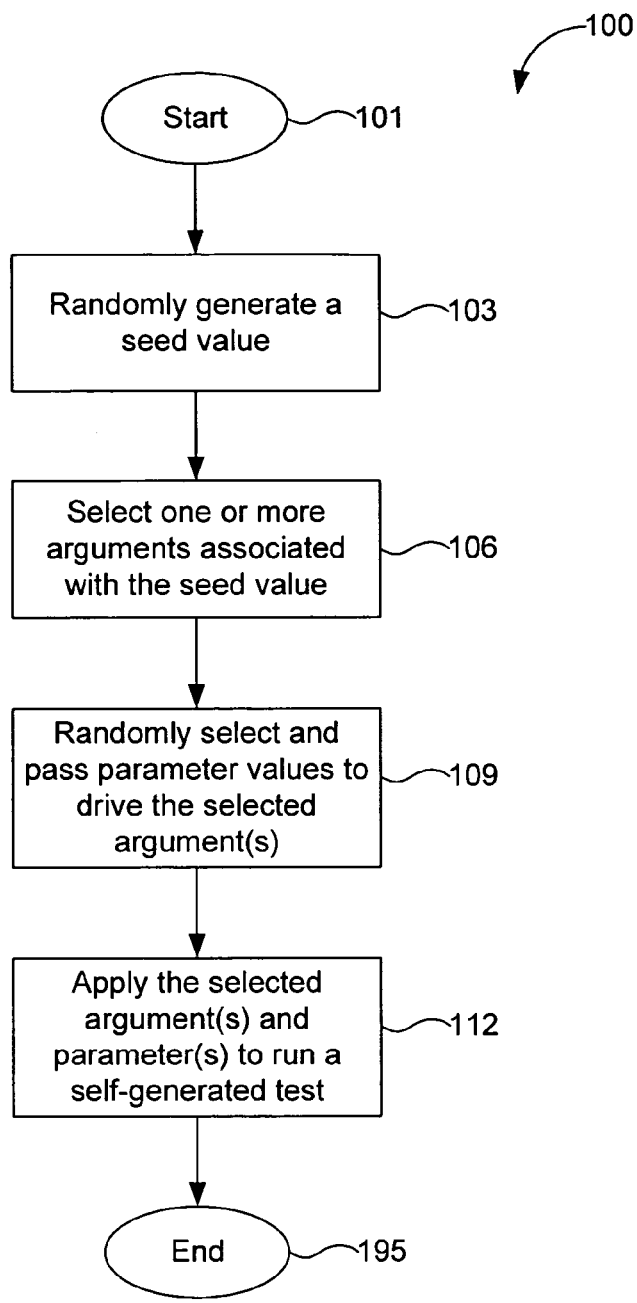
FIG. 1 illustrates an operational flow for producing a self-generated automated test.

Referring to FIG. 1, flowchart 100 represents a general operational flow for producing a self-generated automated test for an SUT. The control flow of flowchart 100 begins at step 101 and passes immediately to step 103. At step 103, a seed value is randomly generated. The seed value is used to select one or more arguments for a self-generated automated test. The seed value can be based on time. A random-number generator can be applied to generate the seed value. Since the seed value serves as a lookup key for selecting one or more arguments, the seed value can also be recorded for future usage. For example, the recorded seed value can be used to recall and re-execute a previously performed test.

Since argument(s) are automatically selected based on the seed value and with little-to-no human interaction, the test is considered to be a "self-generated" test. The seed value is automatically generated in response to an event. The event can be the placement of an SUT into a specific location (such as, an I/O port, etc.), the activation of the SUT (such as, turning the SUT on or off, requesting the SUT to perform a certain function, etc.), or a programmable schedule. Therefore since the seed value and hence the self-generated test are automatically produced, the test is considered to be a self-generated "automated" test.

At step 106, the one or more arguments associated with the randomly generated seed value are selected. A software application can be used to write the one or more arguments into a new test script or a test application program for evaluating the SUT. Since the SUT may have multidimensional functions, each argument is prepared to evaluate one or more of these functions. The SUT may also have multidimensional parameters. Each argument may include variables for receiving input values for a specified parameter.

Therefore at step 109, parameter values are randomly selected and passed to the script or program, so that the parameter values can be applied to drive the one or more arguments. A configuration file can be executed to select a parameter value or values. Each parameter value that is selected is applied to establish a limit for a corresponding parameter. A random-number generator can be utilized to generate values for the test parameters. The parameter values can also be recorded with the seed value, such that a previous self-generated automated test can be repeated.

At step 112, the test script or test application program is translated, compiled, and/or executed to perform the self-generated automated test on the SUT. Afterwards, the control flow ends as indicated at step 195.

As previously discussed, conventional test script automation programs lack the ability to self-generate a test case. However, referring back to FIG. 1, the arguments and parameter values of the self-generated automated test (described with reference to flowchart 100) are automatically selected. Therefore, specific tests can be automatically produced to cover each and every test case as required to effectively evaluate an SUT. Tests can also be produced that would cover fringe cases pertaining to obscure test scenarios. Moreover, the tests are automatically generated without a programmer having to manually write a specific test to cover each possible scenario.

Even if a conventional test script automation programs could randomly generate a specific test case, it would be impossible to reproduce the test case. If, for example, the test program fails to detect a failure or incorrectly detects a failure, the programmer may want to re-run the test to investigate the error. Conventional test programs have no way of tracking randomly generated test cases. As such, the test cannot be easily recreated.

However, as described above with reference to FIG. 1, a seed value serves as a lookup key for selecting one or more arguments for a test. The seed value, along with the test parameter values, can be recorded, such that a previous self-generated automated test can be recalled and re-executed.

Figure 2:
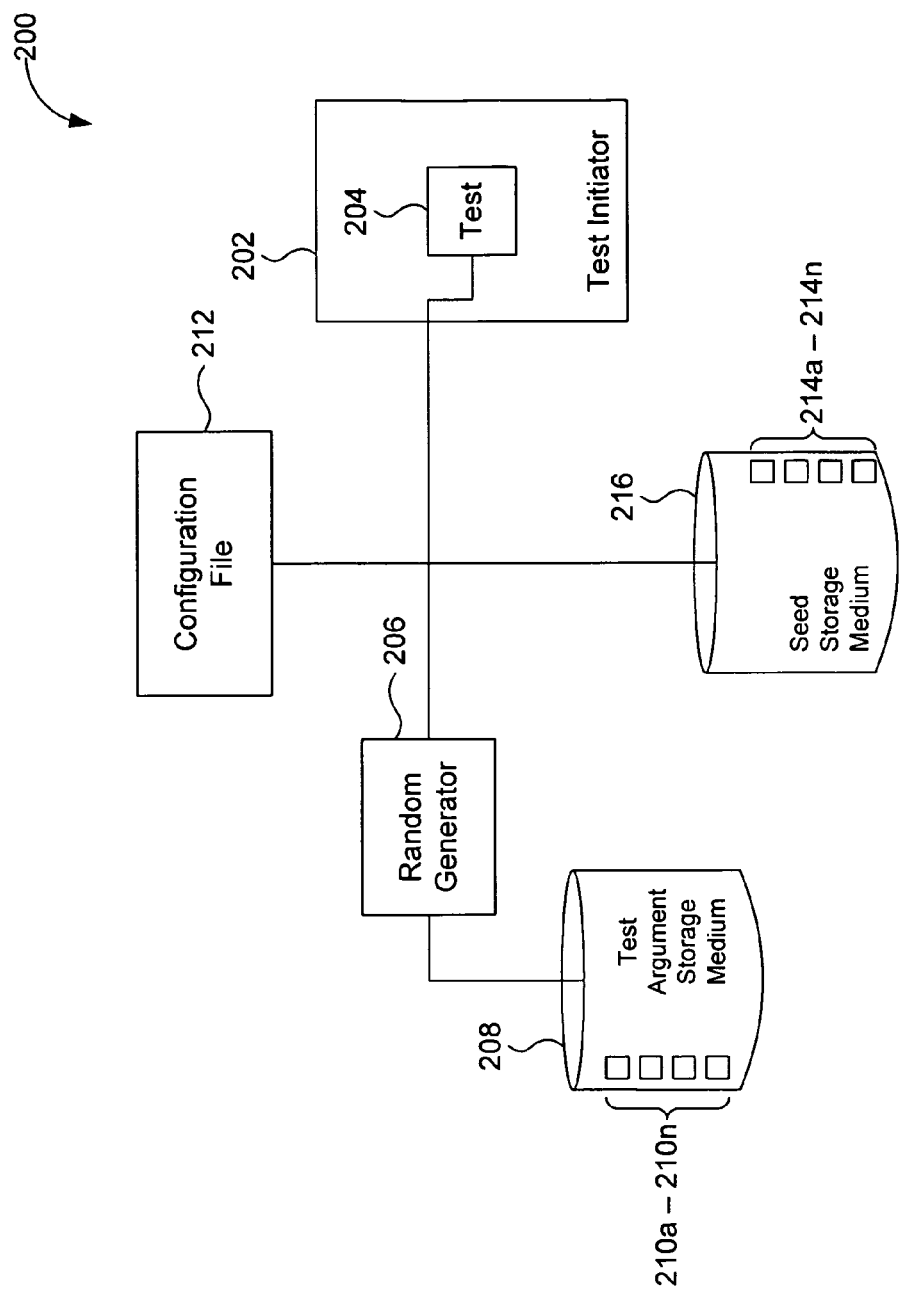
FIG. 2 illustrates a self-generated automated test system.

FIG. 2 illustrates an embodiment of a self-generated automated test system 200 that is useful for implementing various aspects of the control flow of flowchart 100. Test system 200 includes a test initiator 202 that produces a self-generated automated test 204. Test initiator 202 can be a script editor or processor. Self-generated automated test 204 can be a script that is subsequently passed to another script, or translated for an application program. Self-generated automated test 204 can also be part of an application program that is passed to another application program and/or subsequently compiled into executable code.

Test initiator 202 is communicatively coupled to a random generator 206, which can be a pseudo-random number generator with a Gaussian distribution model. Random generator 206 produces a seed value 214 (shown as seed values 214a-214n), which can be used to select one or more arguments 210a-210n for self-generated automated test 204. The selected seed value can be recorded in seed storage medium 216 for future usage.

A test argument storage medium 208 contains a plurality of arguments 210a-210n that have been created to evaluate various functions of an SUT. As discussed with reference to FIG. 1, a seed value 214 is associated with one or more arguments 210a-210n, and serves as a lookup key for selecting an argument(s) 210a-210n.

A configuration file 212 supplies one or more test parameters for self-generated automated test 204. Each argument 210 may contain one or more parameter variables. Configuration file 212 can contain a range of possible values for each parameter variable. Upon execution, configuration file 212 passes a parameter value to self-generated automated test 204. Random generator 206 (or another random generator) can be used to randomly select a specific parameter value from the range of values identified in configuration file 212. The selected parameter values can be recorded with the selected seed 214, so that a previous self-generated automated test 204 can be repeated.

Figure 3A:
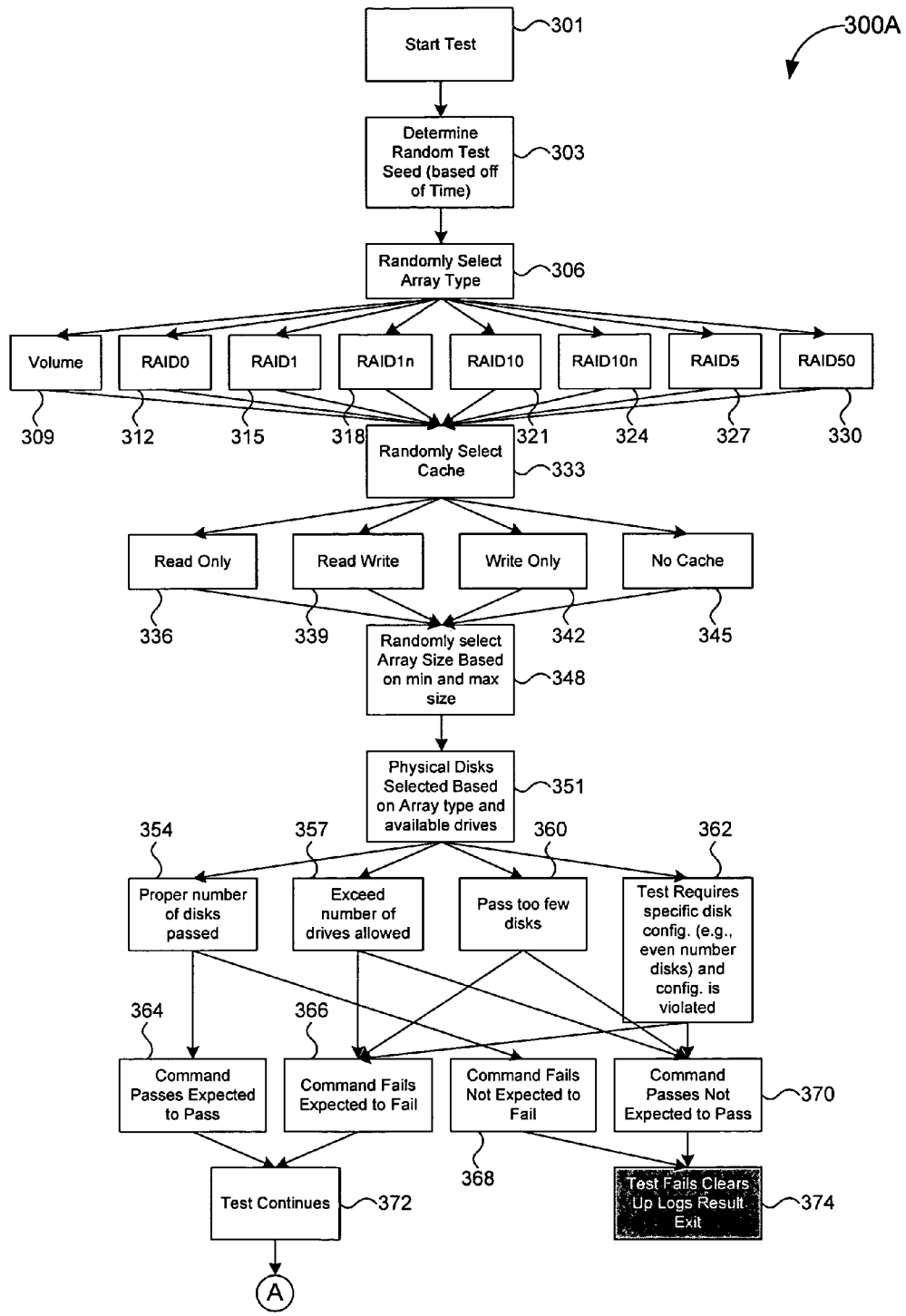
FIGS. 3A-3B illustrate an operational flow for producing a self-generated automated test to evaluate a RAID controller.
Figure 3B:
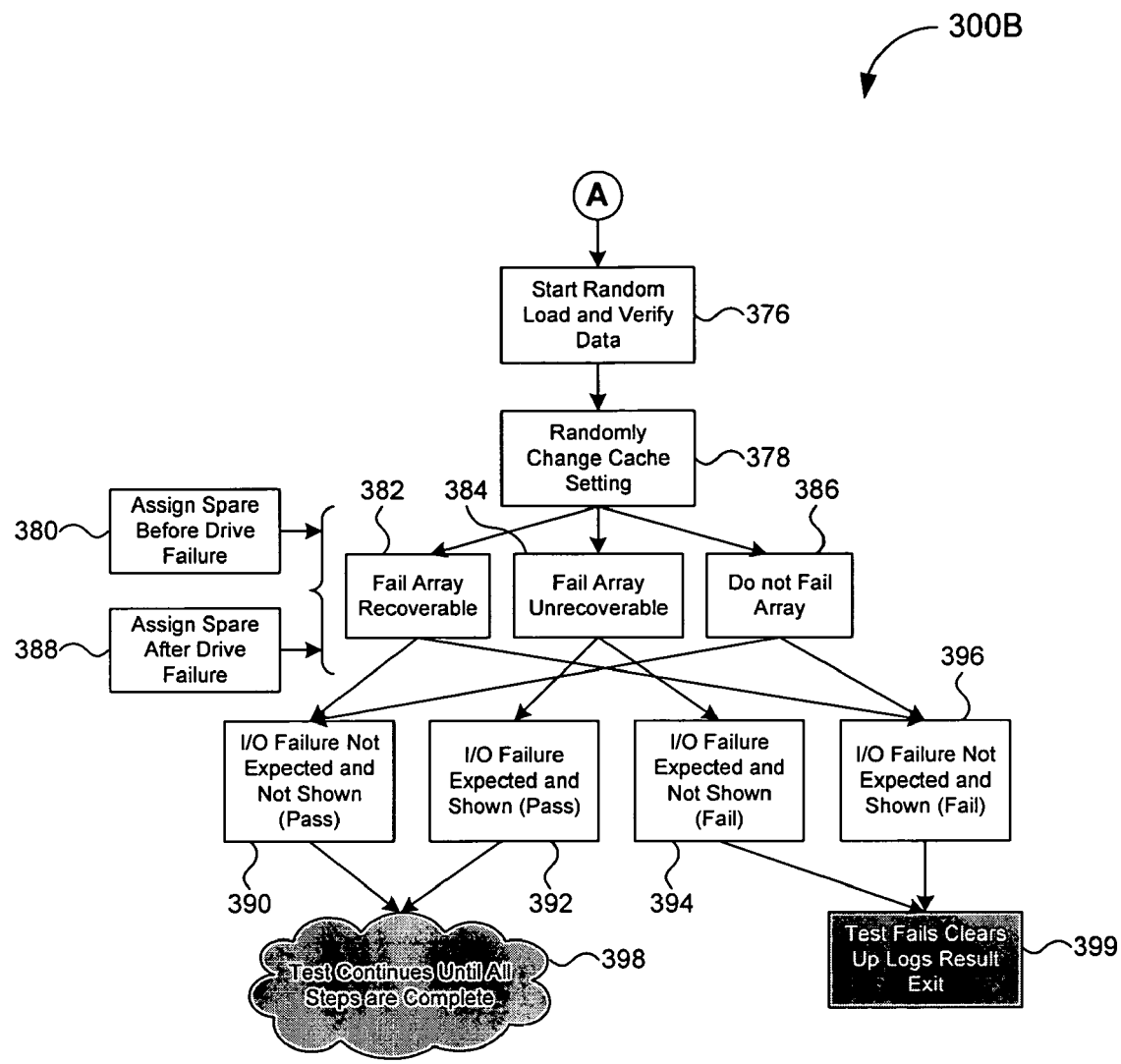

As discussed above, self-generated automated test 204 can be executed to evaluate any type of SUT having multidimensional functions and/or multidimensional parameters. In an embodiment, a self-generated automated test 204 can be executed to evaluate a controller for a redundant array of inexpensive disks (RAID). Referring to FIGS. 3A-3B, flowcharts 300A and 300B (described collectively herein as "flowchart 300") illustrate the general operational flow for producing a self-generated automated test (e.g., test 204) to evaluate a RAID controller.

The control flow of flowchart 300 begins at step 301 and passes immediately to step 303. At step 303, a seed value (e.g., seed value 214) is randomly generated. The seed value is used to select one or more arguments that have been prepared to test one or more functions of a RAID controller.

At step 306, an array type is randomly selected. As discussed above, a configuration file can be executed to provide one or more parameter values that drive the selected argument(s) to produce a test array for the RAID controller. One type of parameter is an array type. The array type may or may not be redundant.

If array type is selected to be volume, RAID0, RAID1, RAID1n, RAID10, RAID10n, RAID5, or RAID50, the control flow passes to steps 309, 312, 315, 318, 321, 324, 327, or 330, respectively. The above array types are provided by way of example, and are not intended to be exhaustive. Other array types can be used.

After selecting the array type, the control flow passes to step 333 and a cache setting is randomly selected. Cache setting is another parameter value that can be provided by the configuration file. If the cache setting is selected to read only, control flow passes to step 336. If the cache setting is selected to read and write, control flow passes to step 339. If the cache setting is selected to write only, control flow passes to step

342. If the cache setting is selected to neither read nor write, control flow passes to step 345.

After selected the cache setting, the control flow passes to step 348 to randomly select an array size, which is another parameter value that can be provided by the configuration file. The configuration file can specify a range having a maximum size and a minimum size, and the actual array size can be randomly selected from the range. In an embodiment, a user can specify the maximum and minimum sizes as a global parameter value.

At step 351, one or more physical drives are selected based on the selected array type and available drives. The configuration file can provide a number of disks used to produce an array to continue testing, and this value is limited by the core. Based on the selected array type and available drives, the selected number of physical drives are tested to determine if it is a valid value.

Control mechanisms can be provided to prevent an improper number of physical drives from being selected. For instance, at step 354, if the proper number of physical drives are selected, the number of drives are validated at step 364 and step 368 to determine whether the drives were expected to pass. If the drives were expected to pass, further testing commences at step 372. Otherwise, the drives were not expected to pass, and a failure notice issued and the results are logged at step 374.

If, at step 357, the number of physical drives exceeds the number of drives allowed, testing is expected to fail at step 366 and the control flow continues at step 372 for further testing. If, however, the testing does not fail when it should have failed, control passes to step 370, and a failure notice is issued and logged at step 374.

If, at step 360, the number of physical drives is less that the number of drives allowed, testing is expected to fail at step 366 and the control flow continues at step 372 for further testing. If, however, the testing does not fail when it should have failed, control passes to step 370, and a failure notice is issued and logged at step 374.

If, at step 362, the test requires a specific disk configuration (such as, an even number of disks, etc.) and the configuration is violated, testing is expected to fail at step 366 and the control flow continues at step 372 for further testing. If, however, the testing does not fail when it should have failed, control passes to step 370, and a failure notice is issued and logged at step 374.

At step 376, data is randomly loaded and verified. At step 378, the cache setting is randomly changed, and at step 380, a spare drive is assigned in anticipation of a potential drive failure.

At steps 382, 384, and 386, the test array is evaluated to determine whether an array has failed. At step 388, a spare drive is assigned if a failure has occurred.

If a failure has occurred and the failure is recoverable, control passes to step 382. The control thereafter passes to step 390 if the input/output (I/O) failure is not expected and not shown. The array is deemed to have passed testing and control passes to step 398 whereupon testing continues until all step are completed.

On the other hand, control passes to step 396 if the I/O failure is not expected but shown. The array is deemed to have failed testing and control passes to step 399 whereupon a failure notice is issued and logged. The control flow ends at step 399.

If, at step 384, a failure has occurred and the failure is unrecoverable, control passes to step 392 if the I/O failure is expected and is shown. The array is deemed to have passed testing and control passes to step 398.

On the contrary, control passes to step 394 if the I/O failure is expected but not shown. The array is deemed to have failed testing and control passes to step 399.

If, at step 386, no failure has occurred, control passes to step 390 if I/O failure is not expected and not shown. The array is deemed to have passed testing and control passes to step 398.

On the contrary, control passes to step 396 if I/O failure is not expected but shown. The array is deemed to have failed testing and control passes to step 399.

As discussed above with reference to FIG. 3, four parameters are specified and randomly selected from a configuration file to test a RAID controller. The parameters include an array type, cache setting, array size, and number of disks. Other parameters could be used.

These parameters are altered with each iteration of a self-generated automated test 204. In an embodiment, a user may specify one or more global parameters which do not necessarily change with each iteration, unless the user alters them. For example, the user can specify the number of test iterations, test time, maximum array size, and/or minimum array size as a global parameter.

In other embodiments, one or more of the global parameters could be automatically selected (randomly or non-randomly) by a software application instead of being specified by the user. One or more of the global parameters could be automatically selected, or otherwise specified, to be fixed for all iterations of a self-generated test 204. Alternatively, one or more of the global parameters could be automatically selected, or otherwise specified, to vary for each iteration of a self-generated test 204.

As described above, the parameters specified by configuration file 212 are randomly selected and vary with each iteration of self-generated test 204. In other embodiments, one or more of these parameters can be selected non-randomly. In other embodiments, a user may specify one or more of the parameters. One or more of these parameters can be automatically selected (randomly or non-randomly), or user specified, to be fixed for all iterations of self-generated test 204.

In the embodiments discussed above, the test arguments 210a-210n are randomly selected according to a seed value. In other embodiments, one or more arguments 210a-210n can be non-randomly selected and/or specified by a user.

FIGS. 1, 2, 3A, and 3B are conceptual illustrations allowing an easy explanation of the present invention. It should be understood that embodiments of the present invention could be implemented in hardware, firmware, software, or a combination thereof. In such an embodiment, the various components and steps would be implemented in hardware, firmware, and/or software to perform the functions of the present invention. That is, the same piece of hardware, firmware, or module of software could perform one or more of the illustrated blocks (i.e., components or steps).

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention is implemented using software, the software can be stored in a computer program product and loaded into computer system using a removable storage drive, hard drive, or communications interface. The control logic (software), when executed by a processor, causes the processor to perform the functions of the invention as described herein.

In another embodiment, aspects of the present invention are implemented primarily in hardware using, for example, hardware components such as application specific integrated circuits (ASICs). Implementation of the hardware state machine so as to perform the functions described herein will be apparent to one skilled in the relevant art(s).

In yet another embodiment, the invention is implemented using a combination of both hardware and software.

While various embodiments of the present invention have been described above, it should be understood that they have been presented by way of example, and not limitation. It will be apparent to one skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A method of performing a self-generated automated test, comprising:
   (A) generating a seed value by a self-generated automated test system;
   (B) selecting, by said self-generated automated test system, one or more arguments based on said seed value;
   (C) accessing, by said self-generated automated test system, one or more parameters for driving said one or more arguments; and
   (D) executing, by said self-generated automated test system, said one or more arguments with said one or more parameters to perform the self-generated automated test.

2. The method of claim 1, further comprising:
   (E) storing, by said self-generated automated test system, said seed value.

3. The method of claim 1, further comprising:
   (E) receiving, by said self-generated automated test system, said one or more arguments from a storage medium.

4. The method of claim 1, wherein step (A) comprises:
   (A)(i) generating said value using a pseudo random number generator.

5. The method of claim 1, wherein step (A) comprises:
   (A)(i) generating a seed value based on time.

6. The method of claim 1, wherein step (A) comprises:
   (A)(i) generating said seed value in response to an event.

7. The method of claim 6, wherein step (A) further comprises:
   (A)(ii) operating a device to be evaluated to thereby produce said event.

8. The method of claim 6, wherein step (A) further comprises:
   (A)(ii) placing a device to be evaluated at a specific location to thereby produce said event.

9. The method of claim 1, wherein step (A) comprises:
   (A)(i) generating said seed value in response to a programmable scheduled event.

10. The method of claim 1, wherein step (A) comprises:
    (A)(i) querying a storage medium to generate said seed value, said seed value being previously generated and recorded at said storage medium, whereby said one or more arguments are executed during said executing step to repeat the self-generated automated test on a device to be evaluated.

11. The method of claim 1, wherein step (C) comprises:
    (C)(i) executing a configuration file to access said one or more parameters.

12. The method of claim 1, wherein step (C) comprises:
    (C)(i) executing a configuration file to randomly access said one or more parameters.

13. The method of claim 1, wherein step (C) comprises:
    (C)(i) accessing a parameter specifying a quantity of iterations for repeating at least a portion of said one or more arguments during said executing step.

14. The method of claim 13, wherein step (C) further comprises:
    (C)(ii) varying at least one parameter during each iteration.

15. The method of claim 1, wherein step (C) comprises:
    (C)(i) enabling an operator to specify at least one parameter.

16. The method of claim 1, wherein step (C) comprises:
    (C)(i) enabling an operator to specify said seed value.

17. A non-transitory machine-readable medium having instructions stored thereon, that when executed by one or more processors, cause the one or more processors to perform a self-generated automated test, the instructions comprising:
    instructions for generating a seed value;
    instructions for storing one or more arguments selected based on said seed value;
    instructions for accessing one or more parameters for driving said one or more arguments; and
    instructions for executing said one or more arguments with said one or more parameters to perform a self-generated automated test.

18. The non-transitory machine-readable medium of claim 17, further comprising:
    instructions for recording or retrieving said seed value.

19. The non-transitory machine-readable medium of claim 17, further comprising:
    instructions for recording said one or more arguments.

20. The non-transitory machine-readable medium of claim 17, wherein said instructions for generating said seed value includes instructions for generating a pseudo random number.

21. The non-transitory machine-readable medium of claim 20, wherein said instructions for generating said pseudo random number generate said seed value.

22. The non-transitory machine-readable medium of claim 20, wherein said instructions for generating said pseudo random number generate said seed value based on time.

23. The non-transitory machine-readable medium of claim 20, wherein said instructions for generating said pseudo random number generate said seed value in response to an event.

24. The non-transitory machine-readable medium of claim 23, wherein said self-generated automated test system is coupled to a device to be evaluated, said device being operated to thereby produce said event.

25. The non-transitory machine-readable medium of claim 23, wherein said one or more processors is coupled to a device to be evaluated, said device being placed at a specific location to thereby produce said event.

26. The non-transitory machine-readable medium of claim 20, wherein said instructions for generating said pseudo random number generate said seed value in response to a programmable scheduled event.

27. The non-transitory machine-readable medium of claim 17, further comprising:
    instructions for storing said seed value, said seed value being previously generated by said instructions for generating and recorded at said storage medium by said instructions for storing said one or more arguments, whereby said instructions for executing executes said one or more arguments to repeat the self-generated automated test on a device to be evaluated.

28. The non-transitory machine-readable medium of claim 17, wherein said instructions for accessing access said one or more parameters.

29. The non-transitory machine-readable medium of claim 17, wherein said instructions for accessing randomly access said one or more parameters.

30. The non-transitory machine-readable medium of claim 17, wherein said instructions for accessing access a parameter specifying a quantity of iterations for repeating at least a portion of said one or more arguments by said instructions for executing.

31. The non-transitory machine-readable medium of claim 30, wherein said instructions for accessing vary at least one parameter during each iteration.

32. The non-transitory machine-readable medium of claim 17, wherein said instructions for accessing enable an operator to specify at least one parameter.

33. The non-transitory machine-readable medium of claim 17, wherein said instructions for accessing enable an operator to specify said seed value.

* * * * *